(12) United States Patent  
Hirako

(10) Patent No.: US 9,658,714 B2
(45) Date of Patent: *May 23, 2017

(54) ELECTRONIC DEVICE, NON-TRANSITORY STORAGE MEDIUM, AND CONTROL METHOD FOR ELECTRONIC DEVICE

(71) Applicant: KYOCERA Corporation, Kyoto (JP)

(72) Inventor: Kenichi Hirako, Osaka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,258

(22) Filed: Sep. 12, 2016

(65) Prior Publication Data

US 2016/0378250 A1 Dec. 29, 2016

Related U.S. Application Data

(63) Continuation of application No. 14/553,759, filed on Nov. 25, 2014, now Pat. No. 9,442,591, which is a
(Continued)

(30) Foreign Application Priority Data

May 25, 2012 (JP) ................................ 2012-119497

(51) Int. Cl.
*G06F 3/041* (2006.01)
*G06F 3/048* (2013.01)
(Continued)

(52) U.S. Cl.
CPC ............ *G06F 3/0416* (2013.01); *G06F 3/041* (2013.01); *G06F 3/0485* (2013.01);
(Continued)

(58) Field of Classification Search
CPC ...... G06F 3/0416; G06F 3/041; G06F 3/0485; G06F 3/0488; G06F 3/04817; G06F 3/04883; G06F 2203/4106
See application file for complete search history.

(56) References Cited

U.S. PATENT DOCUMENTS 5,053,757 A 10/1991 Meadows et al.
2006/0279548 A1* 12/2006 Geaghan ............... G06F 3/0416
345/173

(Continued)

FOREIGN PATENT DOCUMENTS

JP H06-214708 A 8/1994
JP H10-149252 A 6/1996

(Continued)

OTHER PUBLICATIONS

International Preliminary Report on Patentability and Written Opinion of the International Searching Authority and translation issued by the Japanese Patent Office for International application No. PCT/JP2013/064440.

*Primary Examiner* — Ariel Balaoing
(74) *Attorney, Agent, or Firm* — Procopio Cory Hargreaves and Savitch LLP

(57) ABSTRACT

An electronic device includes a position detection module configured to detect a touch position on a display surface of a display module touched by a user; a position data output module configured to output first position data and second position data based on position data on the touch positions detected by the position detection module; and a display control module configured to control the display module based on the first position data or the second position data output from the position data output module. The first position data is position data obtained by averaging position data on the touch positions respectively detected at detection timings. The second position data is position data on the (Continued)

touch position detected at individual detection timing. The display control module selects the first position data or the second position data to control the display module, based on a predetermined selection condition.

8 Claims, 10 Drawing Sheets

Related U.S. Application Data continuation of application No. PCT/JP2013/064440, filed on May 24, 2013.

(51) Int. Cl.
*G06F 3/0488* (2013.01)
*G06F 3/0485* (2013.01)
*G06F 3/0481* (2013.01)

(52) U.S. Cl.
CPC ........ *G06F 3/0488* (2013.01); *G06F 3/04817* (2013.01); *G06F 3/04883* (2013.01); *G06F 2203/04106* (2013.01)

(56) References Cited

U.S. PATENT DOCUMENTS

| | | | | |
|---|---|---|---|---|
| 2011/0193791 | A1* | 8/2011 | Tong | G06F 3/044 345/173 |
| 2014/0176498 | A1* | 6/2014 | Yanase | G06F 3/044 345/174 |

FOREIGN PATENT DOCUMENTS

| | | |
|---|---|---|
| JP | H08-179874 A | 7/1996 |
| JP | S63-304313 A | 12/1998 |
| JP | 2011-097254 A | 5/2011 |

* cited by examiner

FIG. 3A

CLASSIFICATION LIST

| APPLICATION | AVERAGING PROCESS |
|---|---|
| HOME | NOT REQUIRE |
| DRAWING | REQUIRE |
| WEB BROWSER | REQUIRE |
| GALLERY | NOT REQUIRE |
| ...... | ...... |

FIG. 3B

SCREEN INFORMATION TABLE

| COMPONENT IMAGE | AREA DATA | TOUCH OPERATION | PROCESSING CONTENTS |
|---|---|---|---|
| ICON | D1 | TAP OPERATION | ACTIVATE APPLICATION |
| THUMBNAIL IMAGE | D2 | SLIDE OPERATION | MOVE ICON |
| HYPERTEXT | D3 | TAP OPERATION | DISPLAY ORIGINAL IMAGE |
| SEARCH BUTTON | D4 | TAP OPERATION | DISPLAY SCREEN AS LINK DESTINATION |
| BACKGROUND IMAGE | D5 | TAP OPERATION | EXECUTE SEARCH PROCESS |
|  |  | FLICK OPERATION | SCROLL SCREEN |
|  |  | SLIDE OPERATION |  |
| ...... | ...... | ...... | ...... |

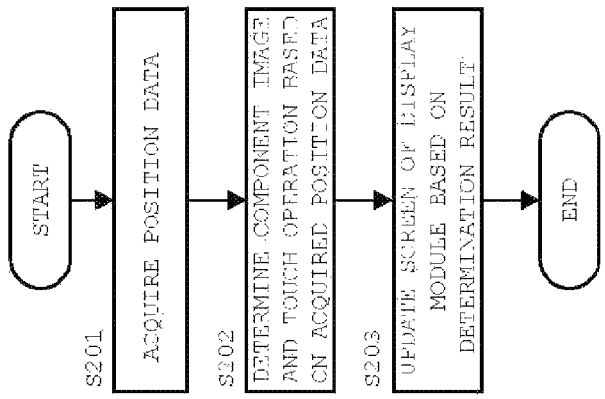
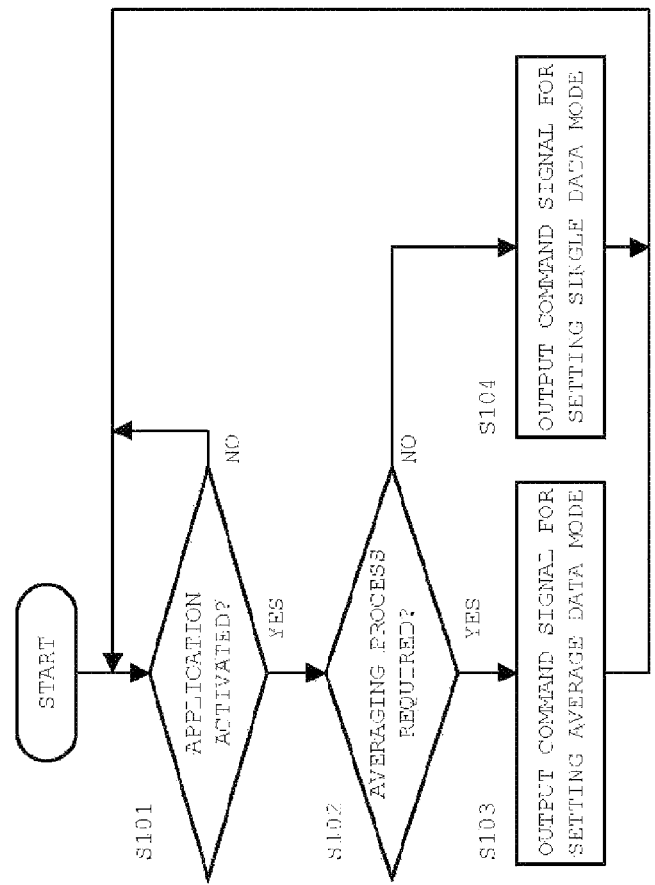

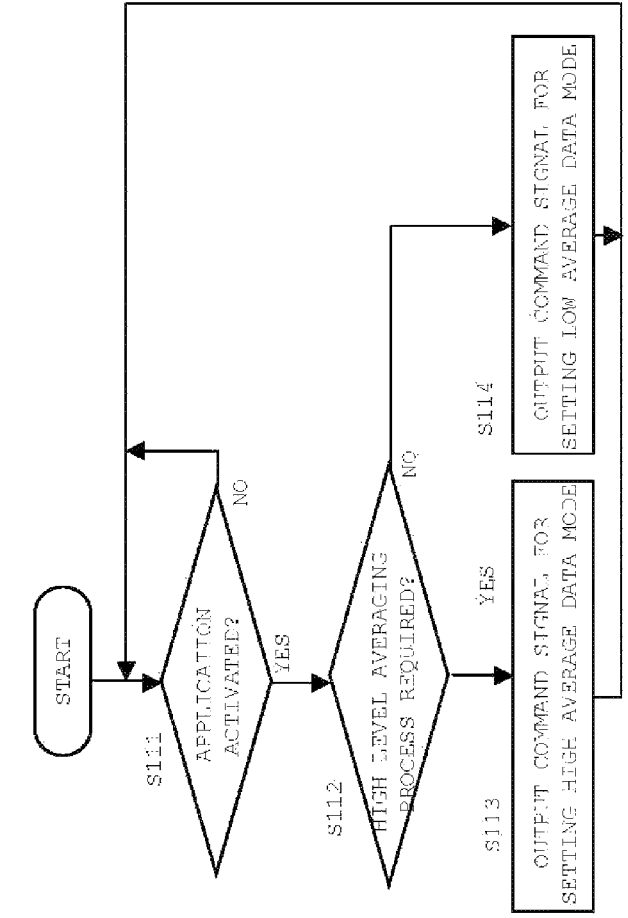

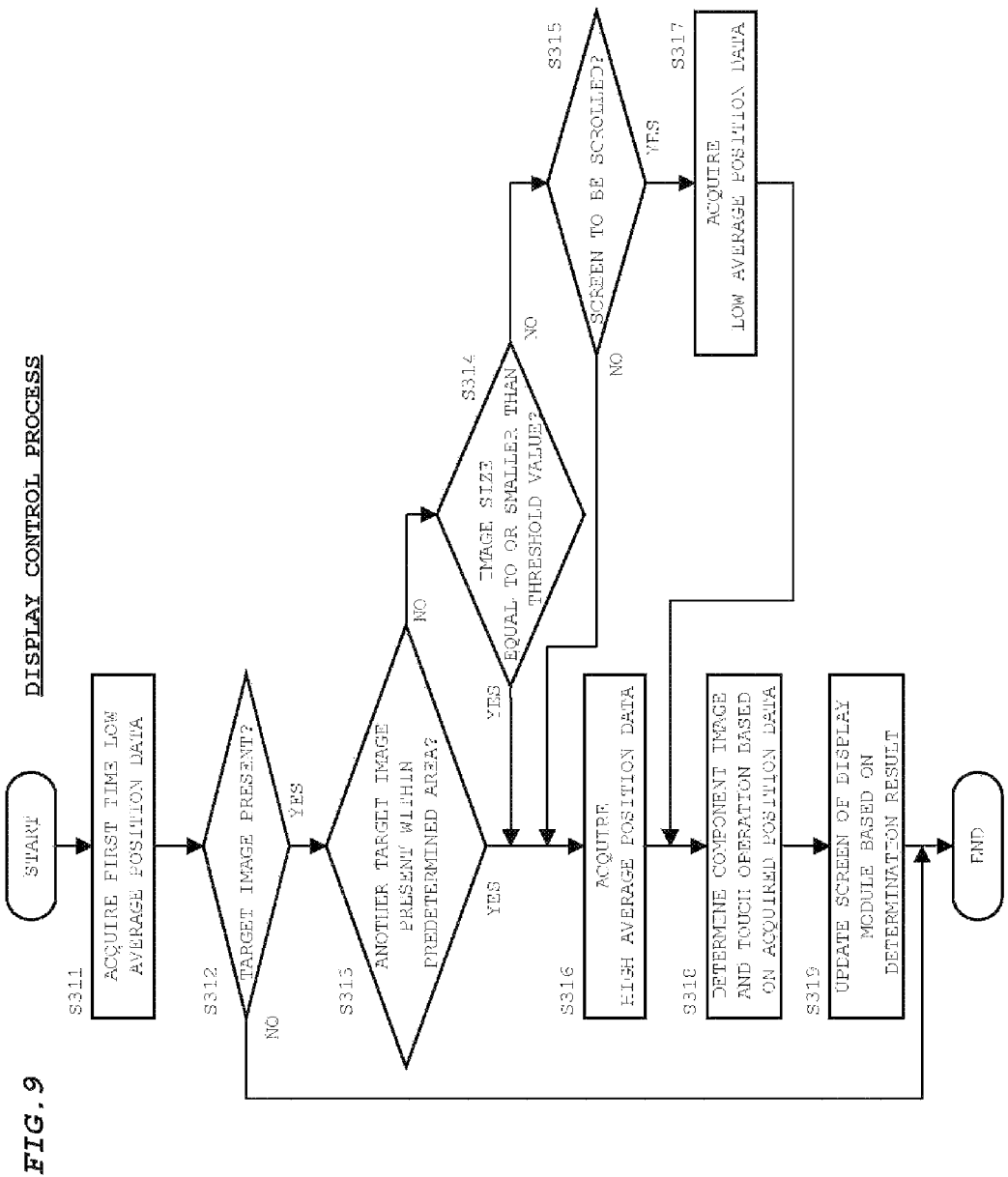

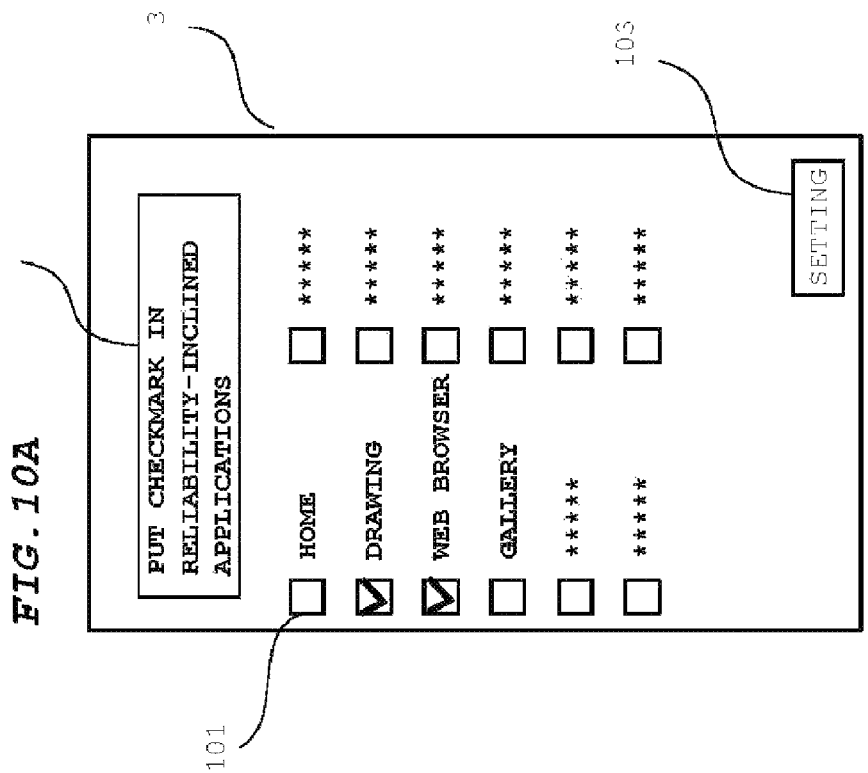

ELECTRONIC DEVICE, NON-TRANSITORY STORAGE MEDIUM, AND CONTROL METHOD FOR ELECTRONIC DEVICE

This application is a continuation of U.S. application Ser. No. 14/553,759 filed 25 Nov. 2014, entitled "ELECTRONIC DEVICE, NON-TRANSITORY STORAGE MEDIUM, AND CONTROL METHOD FOR ELECTRONIC DEVICE", which is a bypass continuation of international patent application PCT/JP2013/006440 filed May 24, 2013, entitled "ELECTRONIC DEVICE HAVING TOUCH DETECTION FUNCTION, PROGRAM, AND CONTROL METHOD FOR ELECTRONIC DEVICE HAVING TOUCH DETECTION FUNCTION", which claims priority to Japanese Patent Application No. 2012-119497 filed May 25, 2012, entitled "ELECTRONIC DEVICE HAVING TOUCH DETECTION FUNCTION, PROGRAM, AND CONTROL METHOD FOR ELECTRONIC DEVICE HAVING TOUCH DETECTION FUNCTION". The disclosure of each of the above is incorporated herein by reference in its entirety.

BACKGROUND

Technical Field

Embodiments of the present disclosure relate to an electronic device, such as a mobile telephone, a PDA (Personal Digital Assistant), a tablet PC, an electronic book terminal, a mobile music player, and a portable TV. Embodiments of the present disclosure also relate to a non-transitory storage medium, and a control method suitable for use in the electronic device.

Disclosure of Related Art

Conventionally, there is known a mobile telephone provided with a touch panel on a display surface, and configured to execute various application programs (hereinafter, simply called as "applications"), based on a user's touch operation with respect to the display surface. In the mobile telephone, it is possible to provide a configuration, in which position data on a touch positions at different detection timings is averaged, and a process based on the touch operation is executed with use of the averaged position data in order to prevent erroneous detection due to noise or finger displacement.

SUMMARY

An electronic device according to a first aspect is provided with a display module configured to display, on a display surface, a screen on which a touch operation is performed; a position detection module configured to detect a touch position on the display surface touched by a user; a position data output module configured to output first position data and second position data based on position data on the touch positions detected by the position detection module; and a display control module configured to control the display module based on the first position data or the second position data output from the position data output module. In this configuration, the first position data is position data obtained by averaging position data on the touch positions respectively detected at detection timings. The second position data is position data on the touch position detected at individual detection timing, or position data obtained by averaging position data on the touch positions respectively detected at detection timings whose number is smaller than the number of detection timings used in obtaining the first position data. The display control module selects the first position data or the second position data to control the display module, based on a predetermined selection condition.

A second aspect of the disclosure relates to a non-transitory storage medium holding a program for a computer to be applied to an electronic device. The electronic device is provided with a display module configured to display, on a display surface, a screen on which a touch operation is performed; a position detection module configured to detect a touch position on the display surface touched by a user; and a position data output module configured to output first position data and second position data based on position data on the touch positions detected by the position detection module. The first position data is position data obtained by averaging position data on the touch positions respectively detected at detection timings. The second position data is position data on the touch position detected at individual detection timing, or position data obtained by averaging position data on the touch positions respectively detected at detection timings whose number is smaller than the number of detection timings used in obtaining the first position data. The program according to the second aspect provides the computer of the electronic device with: a function of controlling the display module based on the first position data or the second position data output from the position data output module, and a function of selecting the first position data or the second position data to control the display module, based on a predetermined selection condition.

A third aspect of the disclosure relates to a control method for an electronic device. The electronic device is provided with a display module configured to display, on a display surface, a screen on which a touch operation is performed; a position detection module configured to detect a touch position on the display surface touched by a user; and a position data output module configured to output first position data and second position data based on position data on the touch positions detected by the position detection module. The first position data is position data obtained by averaging position data on the touch positions respectively detected at detection timings. The second position data is position data on the touch position detected at individual detection timing, or position data obtained by averaging position data on the touch positions respectively detected at detection timings whose number is smaller than the number of detection timings used in obtaining the first position data. The control method according to the third aspect includes selecting the first position data or the second position data to control the display module, based on a predetermined selection condition; and controlling the display module based on the selected position data.

BRIEF DESCRIPTION OF THE DRAWINGS

These and other objects, and novel features of the present disclosure will become more apparent upon reading the following detailed description of the embodiment along with the accompanying drawings.

FIGS. 3A and 3B are diagrams respectively showing a classification list and a screen information table according to the first embodiment;

FIGS. 4A and 4B are flowcharts respectively showing a position data switching process and a display control process according to the first embodiment;

FIGS. 5A and 5B are diagrams for describing a position data switching process according to a modification of the first embodiment;

FIG. 9 is a flowchart showing a display control process according to a modification of the second embodiment; and FIGS. 10A and 10B are diagrams for describing another modification.

The drawings are provided mainly for describing the present disclosure, and do not limit the scope of the present disclosure.

DESCRIPTION OF PREFERRED EMBODIMENTS

In the following description, a control module 11 corresponds to a "display control module" in the claims. A touch panel 14a corresponds to a "position detection module" in the claims. A panel controller 14b corresponds to a "position data output module" in the claims. The description regarding the correspondence between the claims and the embodiments is merely an example, and the claims are not limited by the description of the embodiments.

First Embodiment

Figure 1B:
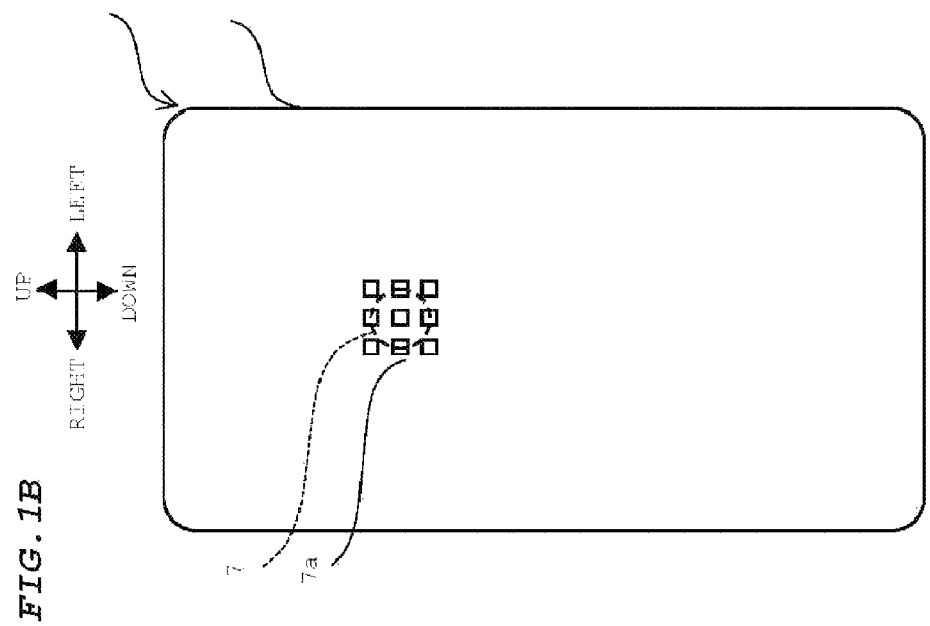
FIGS. 1A and 1B are diagrams showing a configuration of a mobile telephone according to a first embodiment.
Figure 1A:
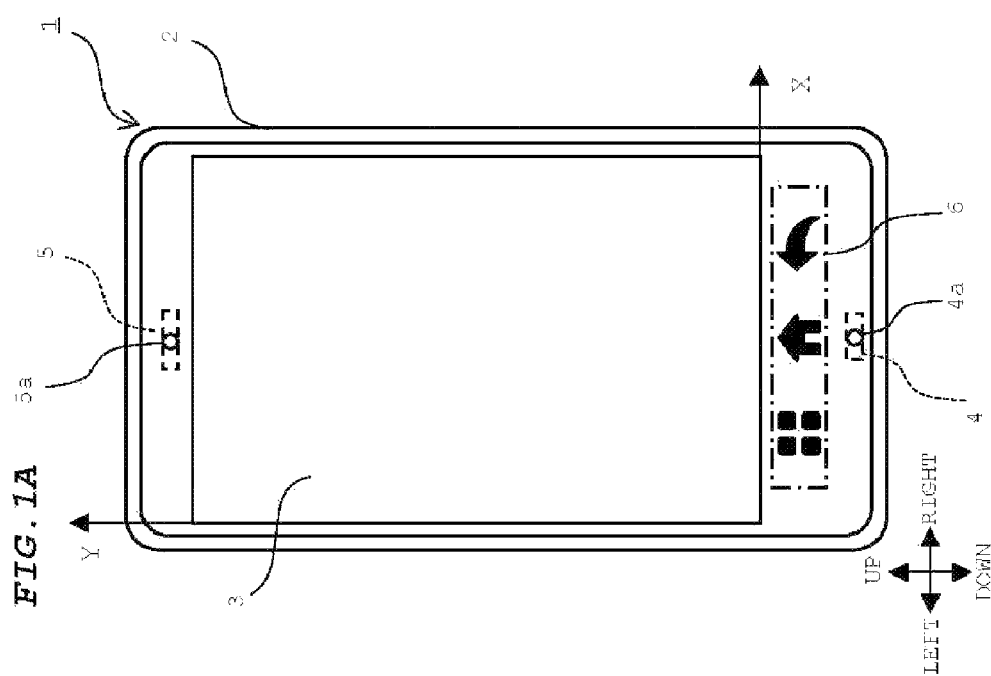

FIGS. 1A and 1B are diagrams showing a configuration of a mobile telephone 1. FIG. 1A and FIG. 1B are respectively a front view and a rear view.

In the following, to simplify the description, as shown in FIGS. 1A and 1B, the lengthwise direction of a cabinet 2 is defined as up and down directions, and the shortwise direction of the cabinet 2 is defined as left and right directions.

The mobile telephone 1 includes the cabinet 2, a display surface 3, a microphone 4, the communication speaker 5, a key operation part 6, and an external speaker 7.

The cabinet 2 has an almost rectangular outline as viewed from the front side. The cabinet 2 includes on a front surface thereof a display surface 3 of a display module which is described later. The display surface 3 has a rectangular contour.

The microphone 4 is disposed within the cabinet 2 at a lower end part thereof, and the communication speaker 5 is disposed within the cabinet 2 at an upper end part thereof. Sounds are input into the microphone 4 through a microphone hole 4a formed in a front surface of the cabinet 2. The microphone 4 generates electric signals according to the input sounds. Sounds are mainly output from the communication speaker 5. The output sounds are released to the outside via an output hole 5a formed in the front surface of the cabinet 2.

The cabinet 2 includes a key operation part 6 on the front surface. The key operation part 6 includes a plurality of operation keys. The operation keys are hard keys, for instance. Various functions are assigned to the respective operation keys in accordance with a program being executed or the like.

The cabinet 2 includes the external speaker 7 therewithin. The cabinet 2 has on the back surface thereof an output hole 7a corresponding to the external speaker 7. Sounds (voices, notification sounds, and the like) output from the external speaker 7 are released to the outside via the output hole 7a.

A screen on which an operation is performed, such as various application execution screens, is displayed on the display surface 3. The user is allowed to perform touch operations of various types by touching the display surface 3 with the fingertip, a touch pen, or the like (hereinafter, simply called as "the finger").

Examples of the touch operations of various types include a tap operation, a long tap operation, a flick operation, and a slide operation. The tap operation is an operation of touching the display surface 3 with the finger, followed by releasing the finger from the display surface 3 within a short time. The long tap operation is an operation of keeping the finger to touch with the display surface 3 for a predetermined time or longer, followed by releasing the finger from the display surface 3. The flick operation is an operation of flicking the display surface 3 with the finger in any direction. The slide operation is an operation of moving the finger in any direction on the display surface 3 while keeping the finger in contact with the display surface 3.

Figure 2:
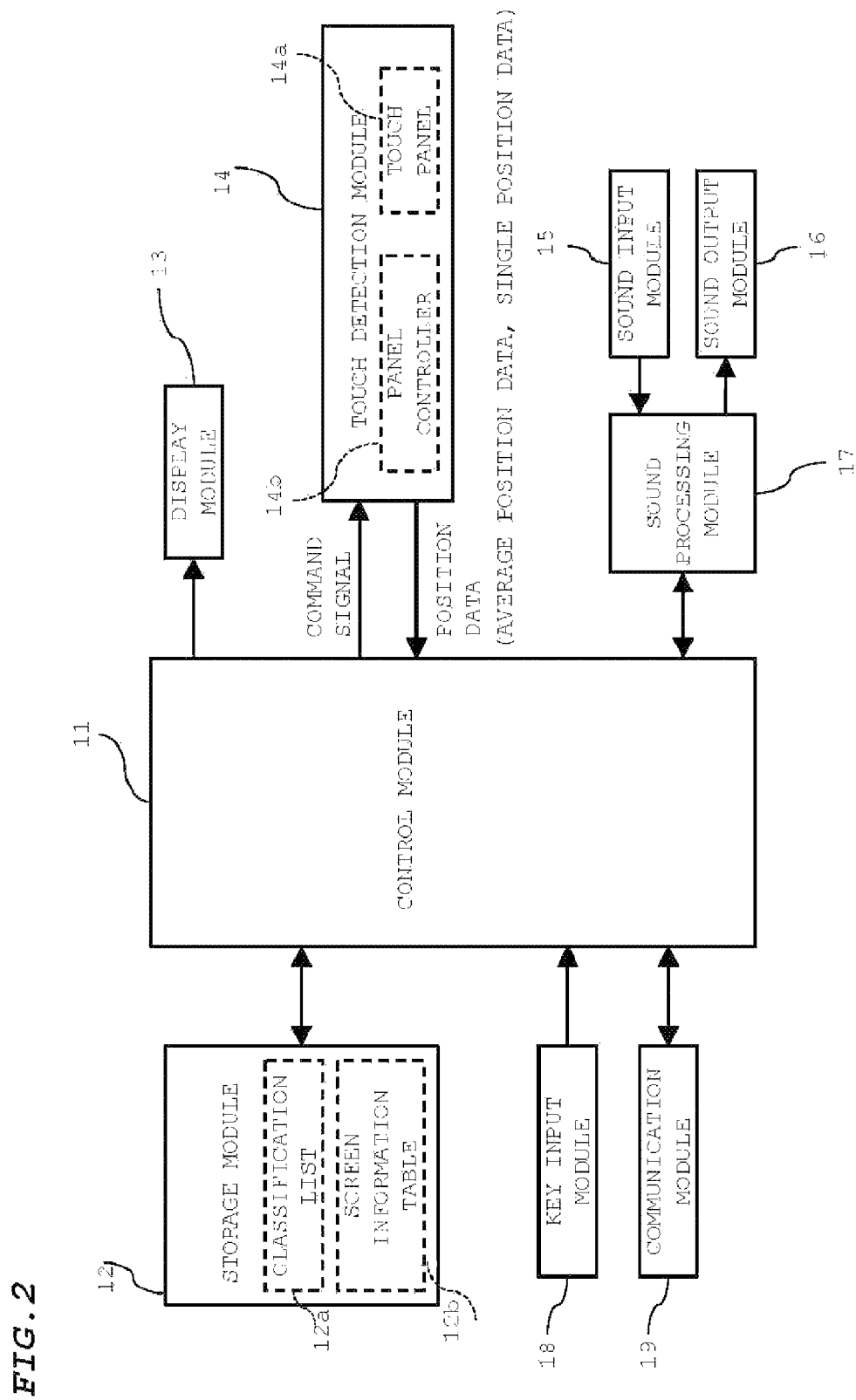
FIG. 2 is a block diagram showing an entire configuration of the mobile telephone according to the first embodiment.

FIG. 2 is a block diagram of an entire configuration of the mobile telephone 1. The mobile telephone 1 includes a control module 11, a storage module 12, a display module 13, a touch detection module 14, a sound input module 15, a sound output module 16, a sound processing module 17, a key input module 18, and a communication module 19.

The storage module 12 includes a ROM, a RAM and the like. The storage module 12 stores various programs. The programs stored in the storage module 12 include control programs for controlling components of the mobile telephone 1 and various applications (for telephone, e-mail, map, game, schedule management, for example).

The storage module 12 is also used as a working area in which data to be temporarily used or generated is stored when a program is executed.

The control module 11 includes a CPU and the like. The control module 11 controls components (the storage module 12, the display module 13, the touch detection module 14, the sound input module 15, the sound output module 16, the sound processing module 17, the key input module 18, the communication module 19, and others) constituting the mobile telephone 1 according to the programs.

The display module 13 includes a liquid crystal display and the like. The display module 13 displays an image (screen) on the display surface 3 according to a control signal and an image signal from the control module 11. The display module 13 is not limited to the liquid crystal display but may be any other display device such as an organic EL display.

The touch detection module 14 is provided with a touch panel 14a and a panel controller 14b. The touch panel 14a is formed into a transparent sheet-like member, and is disposed on the front surface of the cabinet 2 in such a manner as to cover the display surface 3. The touch panel 14a detects contact of the finger with the display surface 3 at a predetermined sampling period. The touch panel 14a may be a touch panel of any type such as an electrostatic capacitive type, an ultrasonic type, a pressure sensitive type, a resistive film type, or a photosensitive type.

As shown in FIG. 1A, there is set an orthogonal coordinate system, on the display surface 3, such that the lowermost and leftmost corner of the display surface 3 is defined as the origin, left-and-right directions are defined as X-axis, and up-and-down directions are defined as Y-axis. When the finger touches the display surface 3, a coordinate value representing a touch position on the display surface 3 is successively output from the touch panel 14a to the panel controller 14b at a predetermined sampling period, as position data on the touch position.

The panel controller 14b has two output modes, i.e., a single data mode and an average data mode. The output mode is set by a command signal from the control module 11. When the single data mode is set, the panel controller 14b directly outputs, to the control module 11, position data (hereinafter, called as "single position data") output from the touch panel 14a at each sampling timing. When the average data mode is set, the panel controller 14b executes an averaging process of averaging single position data output from the touch panel 14a at sampling timings, and outputs the averaged position data (hereinafter, called as "average position data") to the control module 11. Average position data corresponds to first position data in the claims, and single position data corresponds to second position data in the claims.

Single position data is started to be output from the touch detection module 14 immediately after a touch position is detected for the first time. On the other hand, average position data is subjected to an averaging process. Accordingly, the average position data is started to be output from the touch detection module 14 at a time after elapse of a time required for the averaging process from detection of the touch position for the first time.

The sound input module 15 includes the microphone 4 and the like. The sound input module 15 outputs electric signals from to the microphone 4 to the sound processing module 17.

The sound output module 16 includes the communication speaker 5, the external speaker 7, and others. The sound output module 16 receives an electric signal from the sound processing module 17, and outputs sound (voice, notification sound, and the like) from the communication speaker 5 or from the external speaker 7.

The sound processing module 17 subjects an electric signal from the sound input module 15 to A/D conversion and the like, and outputs a converted digital sound signal to the control module 11. The sound processing module 17 subjects the digital sound signal from the control module 11 to a decoding process and D/A conversion and the like, and outputs a converted electric signal to the sound output module 16.

When any of the operation keys in the key operation part 6 is pressed, the key input module 18 outputs a signal corresponding to the pressed operation key to the control module 11.

To perform telephone calls and data communications, the communication module 19 includes a circuit for signal conversion, an antenna for radio wave transmission/reception, and the like. The communication module 19 converts a signal for telephone calls or data communications output from the control module 11 into a radio signal, and transmits the converted radio signal via the antenna to a base station or another communication device or the like as a destination of communications. Furthermore, the communication module 19 also converts radio signals received via the antenna into a signal in a form capable of being used by the control module 11, and outputs the converted signal to the control module 11.

The control module 11 executes a position data switching process for switching the position data to be output from the touch detection module 14 between single position data and average position data in accordance with an application to be executed. Further, the control module 11 executes a display control process with respect to the display module 13, based on position data (single position data, average position data) output from the touch detection module 14.

FIG. 3A is a diagram showing a classification list 12a for use in the position data switching process. FIG. 3B is a diagram showing a screen information table 12b for use in the display control process.

The storage module 12 stores the classification list 12a. As shown in FIG. 3A, in the classification list 12a, applications loaded in the mobile telephone 1 are classified into applications that require a position data averaging process, and applications that do not require a position data averaging process. The applications that require an averaging process are applications (hereinafter, called as "reliability-inclined applications"), in which reliability of a touch operation is required to be enhanced by reducing an influence of noise or finger displacement. The applications that do not require an averaging process are applications (hereinafter, called as "followability-inclined applications"), in which followability in operation of the mobile telephone 1 with respect to a touch operation is required to be enhanced, as compared with reliability of a touch operation, because an influence of noise or finger displacement is small.

As shown in FIG. 3A, examples of the reliability-inclined applications are a drawing application and a web browser application. Examples of the followability-inclined applications are a home application and a gallery application.

When the drawing application is used, the user draws a picture on the display surface 3 by moving the finger on the display surface 3. Accordingly, it is necessary to prevent blur of a line drawn on the display surface 3 due to finger displacement or the like. Many information items are displayed on a web screen to be displayed on the display surface by a web browser application. As a result, images serving as targets for a touch operation such as a search button and a hypertext (a text in which a hyperlink is set), which are included in the web screen, have a relatively small size. Accordingly, when the web browser application is used, it is necessary to securely detect a touch operation with respect to a small image on a screen.

The home application is an application for use in displaying a home screen on the display surface 3. When the home application is used, the user may scroll a screen by a flick operation or a slide operation in order to select an intended icon from among a variety of icons disposed on the home screen. The gallery application is an application for managing photographs and videos. When the gallery application is used, the user may scroll a screen by a flick operation or a slide operation in order to select an intended thumbnail image on a screen on which thumbnail images such as photographs and videos are listed. When the home application and the gallery application are used, it is desirable for the user to quickly scroll a screen by a flick operation or a slide operation.

The screen information table 12b relating to a screen to be displayed is configured in the storage module 12 when the screen is displayed on the display module 13. The screen information table 12b is updated in accordance with updating of the screen. As shown in FIG. 3B, the screen information table 12b stores, regarding component images constituting a screen such as icons and background images, area data representing a position/area of each component image residing on the display surface 3, a touch operation assigned to each component image, and processing contents corresponding to a touch operation. In the case where there is a component image that does not serve as a target for a touch operation, such as a background image of a screen that is not scrolled, data relating to a touch operation, and data relating to processing contents are not stored in the respective columns (storage areas) of the touch operation and of the processing contents in the screen information table 12b.

FIG. 4A is a flowchart showing the position data switching process. In the following, the position data switching process is described.

When the mobile telephone 1 is activated, first of all, the home application is activated by the control module 11, and a home screen is displayed on the display surface 3. When a tap operation of an intended icon is performed on the home screen, the application corresponding to the operated icon is activated by the control module 11, and an execution screen is displayed on the display surface 3.

When the home application or other application is activated (S101: YES), the control module 11 determines whether the activated application is an application that requires a position data averaging process, referring to the classification list 12a (S102).

When it is determined that the activated application is an application that requires an averaging process, such as a web browser application or a drawing application (S102: YES), the control module 11 selects average position data as position data for use in control of the display module 13, and outputs, to the touch detection module 14, a command signal for setting the output mode of the panel controller 14b to the average data mode (S103). The output mode of the panel controller 14b is set to the average data mode, and average position data is output from the panel controller 14b to the control module 11.

On the other hand, when it is determined that the activated application is an application that does not require an averaging process such as a home application or a gallery application (S102: NO), the control module 11 selects single position data, as position data for use in control of the display module 13, and outputs, to the touch detection module 14, a command signal for setting the output mode of the panel controller 14b to the single data mode (S104). The output mode of the panel controller 14b is set to the single data mode, and single position data is output from the panel controller 14b to the control module 11.

When the process of Step S103 or Step S104 is executed, the flowchart returns to the process of Step S101. The control module 11 monitors whether a new application has been activated (S101).

FIG. 4B is a flowchart showing the display control process. In the following, the display control process is described.

When a user's touch operation is performed, the control module 11 acquires position data from the touch detection module 14 (S201). When the output mode is set to the average data mode, the control module 11 acquires average position data from the touch detection module 14; and when the output mode is set to the single data mode, the control module 11 acquires single position data from the touch detection module 14. When the user's touch operation is being performed, the control module 11 successively acquires the average position data or the single position data.

The control module 11 determines a component image for which a touch operation has been performed referring to the screen information table 12b, and determines the type of the touch operation, based on the acquired position data (S202). For instance, when a touch position is not detected within a predetermined first time after the touch position has been detected, the control module 11 determines that a tap operation has been performed. When a touch position is continued to be detected for a predetermined second time or longer after the touch position has been detected, and thereafter, the touch position is not detected any longer, the control module 11 determines that a long tap operation has been performed. When a touch position is moved by a predetermined first distance or longer within a predetermined third time after the touch position has been detected, and thereafter, the touch position is not detected any longer, the control module 11 determines that a flick operation has been performed. When a touch position is moved by a predetermined second distance or longer after the touch position has been detected, the control module 11 determines that a slide operation has been performed.

The control module 11 executes a process assigned to a component image for which a touch operation has been performed, and to the type of the touch operation, referring to the screen information table 12b, and updates the screen of the display module 13 (S203).

For instance, when a slide operation is performed with respect to a background image on a home screen, the control module 11 updates the screen of the display module 13 in such a manner that the screen is scrolled in accordance with the movement of the finger. When the home application is executed, single position data is used for control of the display module 13. Accordingly, the mobile telephone can quickly scroll the screen in response to the movement of the finger.

For instance, when the finger slides on the display surface 3 on a drawing application execution screen, the control module 11 successively updates the screen of the display module 13 in such a manner that a line is drawn along the trajectory of the finger in accordance with the movement of the finger. When the drawing application is executed, average position data is used for control of the display module 13. This makes it possible to draw a clear line, while suppressing line displacement, even when the finger is slightly displaced during a sliding operation.

As described above, according to the first embodiment, position data suitable for an application to be executed is used for detecting a touch operation, out of the single position data and the average position data. This is advantageous in enhancing reliability of a touch operation, while preventing lowering of followability.

Modification of First Embodiment

FIGS. 5A and 5B are diagrams for describing a position data switching process according to a modification. FIG. 5A is a diagram showing a classification list 12a in the modification. FIG. 5B is a flowchart showing the position data switching process in the modification.

In the first embodiment, the panel controller 14b has, as output modes, the average data mode in which average position data is output, and the single data mode in which single position data is output.

In the modification, a panel controller 14b has, as output modes, a high average data mode and a low average data mode. In the high average data mode, pieces of single position data whose number is larger than the number of data pieces in the low average data mode are averaged by a high-level averaging process, and the averaged position data (hereinafter, called as "high average position data") is output. In the low average data mode, pieces of single position data whose number is smaller than the number of data pieces in the high average data mode are averaged by a low-level averaging process, and the averaged position data (hereinafter, called as "low average position data") is output. A delay time until low average position data is output after single position data is output for the first time is shortened, as compared with a delay time when high average position data is output.

High average position data corresponds to first position data in the claims, and low average position data corresponds to second position data in the claims.

As shown by the classification list 12a in FIG. 5A, the high-level averaging process is applied to reliability-inclined applications such as a drawing application and a web browser application, and the low-level averaging process is applied to followability-inclined applications such as a home application and a gallery application.

The position data switching process in the modification is described referring to the flowchart of FIG. 5B.

When an application is activated (S111: YES), a control module 11 determines whether the activated application is an application that requires the high level averaging process, referring to the classification list 12a (S112).

When it is determined that the activated application is an application that requires the high level averaging process (S112: YES), the control module 11 selects high average position data, as position data for use in control of a display module 13, and outputs, to a touch detection module 14, a command signal for setting the output mode of the panel controller 14b to the high average data mode (S113). The output mode of the panel controller 14b is set to the high average data mode, and high average position data is output from the panel controller 14b to the control module 11.

On the other hand, when it is determined that the activated application is an application that does not require the high level averaging process (S112: NO), the control module 11 selects low average position data, as position data for use in control of the display module 13, and outputs, to the touch detection module 14, a command signal for setting the output mode of the panel controller 14b to the low average data mode (S114). The output mode of the panel controller 14b is set to the low average data mode, and low average position data is output from the panel controller 14b to the control module 11.

As described above, the modification is also advantageous in enhancing reliability of a touch operation, while preventing lowering of followability, as well as the first embodiment. However, the effect of preventing lowering of followability may be slightly lowered, and reliability of a touch operation may be slightly enhanced, as a whole, as compared with the first embodiment.

Second Embodiment

In the first embodiment, an application program to be executed is set as a selection condition, and average position data or single position data is selected as position data for use in control of the display module 13, based on the application program to be executed.

In the second embodiment, a status of a screen regarding an initial touch position (touch position for the first time) to be detected by a touch panel 14a when a touch operation is performed, and regarding the vicinity of the initial touch position, is defined as a selection condition for selecting position data. Specifically, the selection condition includes judgments as to whether a target image other than a target image residing at the initial touch position is present within a predetermined area from the initial touch position, whether the size of the target image residing at the initial touch position is equal to or smaller than a predetermined threshold value, and whether a touch operation for scrolling a screen is assigned to the target image residing at the initial touch position.

Figure 6:
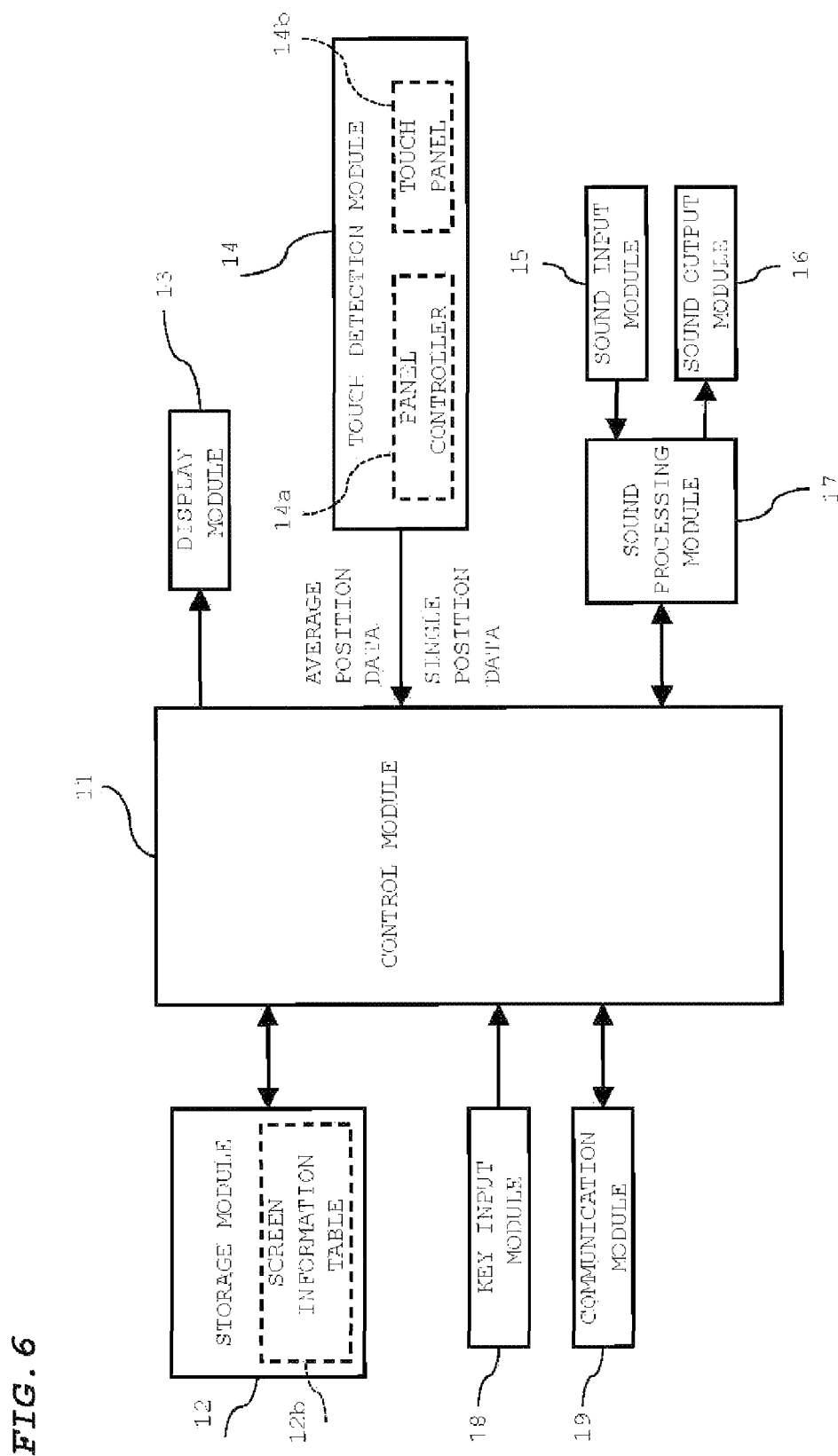
FIG. 6 is a block diagram showing an entire configuration of a mobile telephone according to a second embodiment.

FIG. 6 is a block diagram showing an entire configuration of a mobile telephone 1.

In the embodiment, there is not provided a configuration, in which the output mode of a panel controller 14b is switched by a command signal from a control module 11. Average position data and single position data are output from the panel controller 14b to the control module 11 in the same period. However, the average position data is subjected to an averaging process. Accordingly, output of the average position data is started with a delay with respect to output of the single position data.

The screen information table 12b shown in FIG. 3B is configured in a storage module 12 when a screen is displayed on a display surface 3, as well as the first embodiment.

The other configuration is substantially the same as the first embodiment.

Figure 7:
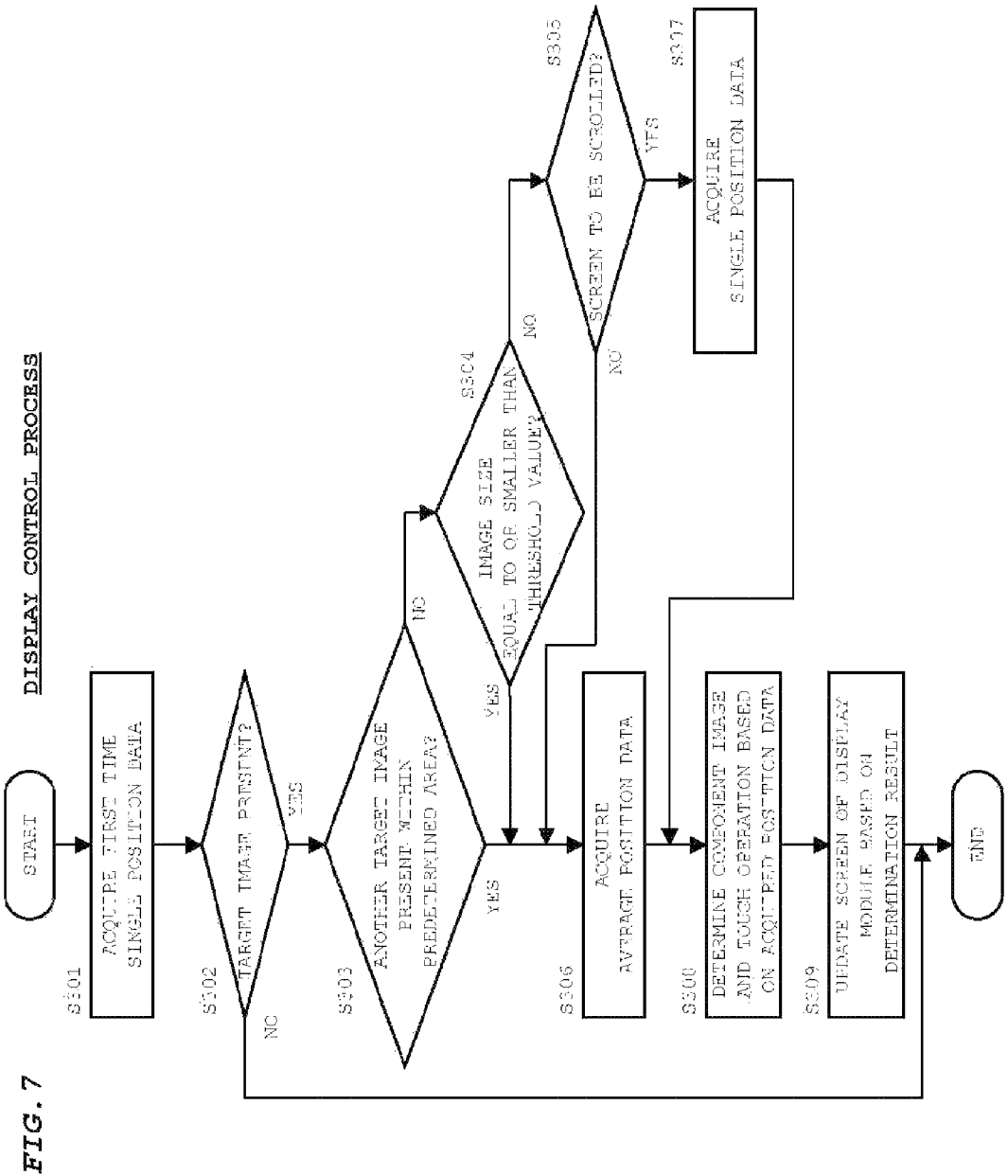
FIG. 7 is a flowchart showing a display control process according to the second embodiment.

FIG. 7 is a flowchart showing a display control process.

When the user performs a touch operation, and single position data representing an initial touch position is output for the first time from a touch detection module 14, the control module 11 acquires the first-time single position data (S301).

The control module 11 determines whether a component image (hereinafter, called as a "target image") serving as a target for a touch operation is present at an initial touch position, referring to the screen information table 12b, based on the acquired single position data (S302). When it is determined that the target image is present (S302: YES), the control module 11 determines whether a target image other than the target image residing at the initial touch position is present within a predetermined area from the initial touch position (S303). When it is determined that another target image is not present (S303:NO), the control module 11 determines whether the size of the target image residing at the initial touch position is equal to or smaller than a predetermined threshold value, based on area data on the target image residing at the initial touch position (S304). When the size of the target image is not equal to or smaller than the predetermined threshold value (S304: NO), the control module 11 determines whether a touch operation for scrolling a screen is assigned to the target image residing at the initial touch position (S305).

When it is determined that another target image is present within the predetermined area from the initial touch position (S303: YES), or when the size of the target image is equal to or smaller than the predetermined threshold value (S304: YES), or when a touch operation for scrolling a screen is not assigned to the target image (S305: NO), the control module 11 selects average position data which is started to be output with a delay with respect to the output of single position data, as position data for use in control of a display module 13, and successively acquires the average position data during a time period when the instant touch operation is performed (S306).

On the other hand, when it is determined that another target image is not present within the predetermined area from the initial touch position (S303: NO), and when the size of the target image is not equal to or smaller than the predetermined threshold value (S304: NO), and when a touch operation for scrolling a screen is assigned to the target image (S305: YES), the control module 11 selects single position data, as position data for use in control of the display module 13, and successively acquires the single position data during a time period when the instant touch operation is performed (S307).

The control module 11 determines a component image for which a touch operation has been performed referring to the screen information table 12b, and determines the type of the touch operation, based on the acquired position data (average position data or single position data) (S308). The control module 11 executes the process assigned to the component image for which a touch operation has been performed, and to the type of the touch operation, referring to the screen information table 12b, and updates the screen of the display module 13 (S309).

Figure 8:
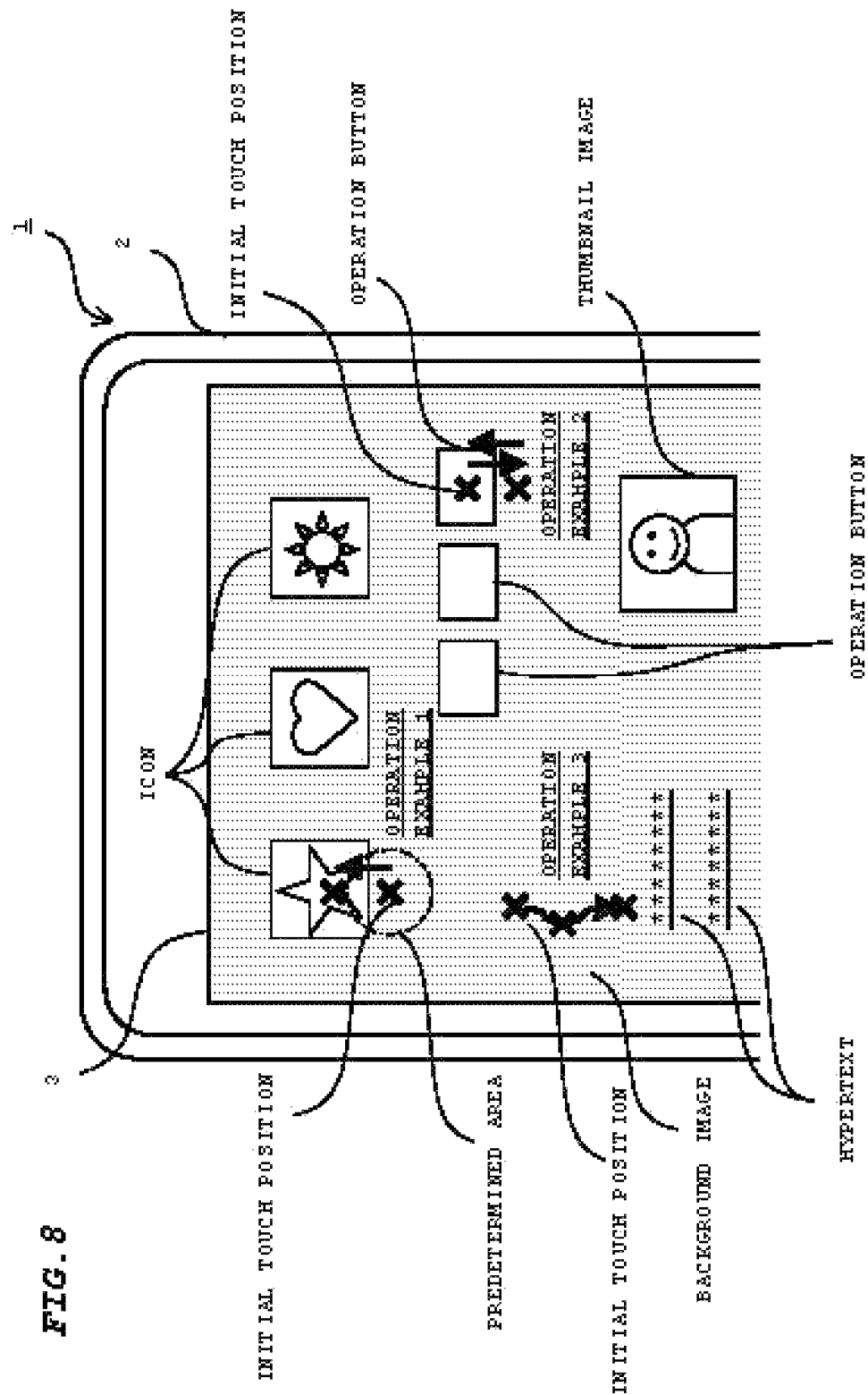
FIG. 8 is a diagram for describing various operation examples to be performed with respect to a display surface according to the second embodiment.

FIG. 8 is a diagram for describing various operation examples to be performed with respect to the display surface 3.

As shown in FIG. 8, when a web browser application is executed, a web screen is displayed on the display surface 3. For instance, the web screen is constituted of component images such as background images, icons, operation buttons, hypertexts, and thumbnail images.

As illustrated by the operation example 1 shown in FIG. 8, the user may touch a position slightly displaced from an icon when the user tries to perform a tap operation with respect to the icon, and the initial touch position may be located on a background image. In this case, the background image, which is a target image, resides at the initial touch position, and the icon as another target image is present in the vicinity of the initial touch position. According to the display control process in FIG. 7, it is determined that another target image resides within a predetermined area from the initial touch position, and average position data is used for determination of a touch operation. According to this configuration, even when the initial touch position is displaced from the icon, immediately moving the touch position from the initial touch position to the icon makes it possible to set the touch position represented by the average position data as the position of the icon. Thus, it is possible to eliminate an erroneous detection such that the background image adjacent to the icon is operated, despite the user's intention to operate the icon.

As illustrated by the operation example 2 shown in FIG. 8, when an operation target is a small operation button, finger displacement may occur during a long tap operation of the operation button, and the touch position may be deviated from the position of the operation button for a short time. When the operation button is small, according to the display control process in FIG. 7, it is determined that the size of the target image is equal to or smaller than the predetermined threshold value, and average position data is used for determination of a touch operation. According to this configuration, even when the touch position is deviated from the position of the operation button for a short time during a long tap operation, it is possible to keep the touch position represented by the average position data on the operation button. Thus, it is possible to prevent invalidation of a long tap operation of an operation button due to finger displacement.

As illustrated by the operation example 3 shown in FIG. 8, it is less likely that finger displacement may cause erroneous detection when a slide operation with respect to a background image is performed in order to scroll a screen, in the case where an icon or the like is not present nearby on the screen. In the aforementioned case, according to the display control process in FIG. 7, it is determined that a touch operation for scrolling a screen is assigned to a target image, and single position data is used for determination of a touch operation. When single position data is used, there is no delay when the single position data is started to be output from the touch detection module 14, unlike the case of average position data. Accordingly, the user can quickly scroll the screen by a slide operation.

As described above, according to this embodiment, a status of a screen regarding a position where a touch operation is performed, and the vicinity of the touch position is determined, and position data suitable for the status of the screen is used for detection of a touch operation, out of the single position data and the average position data. This is advantageous in enhancing reliability of a touch operation, while preventing lowering of followability.

Modification of Second Embodiment

FIG. 9 is a flowchart showing a display control process according to a modification of the second embodiment.

In the modification, high average position data and low average position data are output from a panel controller 14b in the same period. The high average position data and the low average position data are as described in the modification of the first embodiment.

When a user's touch operation is performed, and low average position data representing an initial touch position is output for the first time from a touch detection module 14, a control module 11 acquires the first-time low average position data (S311).

The control module 11 determines whether a target image is present at an initial touch position, referring to the screen information table 12b, based on the acquired low average position data (S312). When it is determined that a target image is present (S312: YES); and when it is determined that another target image is present within a predetermined area from the initial touch position (S313: YES), or the size of the target image is equal to or smaller than a predetermined threshold value (S314: YES), or a touch operation for scrolling a screen is not assigned to the target image (S315: NO), the control module 11 selects high average position data which is started to be output with a delay with respect to the output of low average position data, as position data for use in control of a display module 13, and successively acquires the high average position data during a time period when the instant touch operation is performed (S316).

On the other hand, when it is determined that another target image is not present within the predetermined area from the initial touch position (S313: NO), and when it is determined that the size of the target image is not equal to or smaller than the predetermined threshold value (S314: NO), and when a touch operation for scrolling a screen is assigned to the target image (S315: YES), the control module 11 selects low average position data, as position data for use in control of the display module 13, and successively acquires the low average position data during a time period when the instant touch operation is performed (S317).

The control module 11 determines a component image for which a touch operation has been performed referring to the screen information table 12b, and determines the type of the touch operation, based on the acquired position data (high average position data or low average position data) (S318). The control module 11 executes the process assigned to the component image for which a touch operation has been performed, and to the type of the touch operation, referring to the screen information table 12b, and updates the screen of the display module 13 (S319).

As described above, the modification is also advantageous in enhancing reliability of a touch operation, while preventing lowering of followability, as well as the second embodiment. However, the effect of preventing lowering of followability may be slightly lowered, and reliability of a touch operation may be slightly enhanced, as a whole, as compared with the second embodiment.

Others

The embodiments and modifications of the present disclosure have been described as above. The present disclosure, however, is not limited by the foregoing embodiments and modifications, and various modifications other than the above are applicable to the embodiments of the present disclosure.

For instance, in the first embodiment and in the second embodiment, both of the single position data and the average position data are output from the touch detection module 14. Alternatively, the touch detection module 14 may be operable to output single position data, but may be inoperable to output average position data. In this configuration, a position data output module is provided in the control module 11. The position data output module generates average position data by averaging pieces of single position data output from the touch detection module 14, and outputs the generated average position data. Further, the position data output module directly outputs the single position data from the touch detection module 14. Further alternatively, the position data output module provided in the control module 11 may be configured to output high average position data and low average position data in the same manner as the panel controllers 14b in the modification of the first embodiment and in the modification of the second embodiment.

In the second embodiment, when the display control process is executed, the control module 11 executes all the processes i.e. the process of Step S303 of determining whether a target image other than the target image residing at the initial touch position is present within a predetermined area from the initial touch position, the process of Step S304 of determining whether the size of the target image residing at the initial touch position is equal to or smaller than a predetermined threshold value, and a process of Step S305 of determining whether a touch operation for scrolling a screen is assigned to the target image residing at the initial touch position. The disclosure is not limited to the above. Alternatively, any one or two of the three processes of Step S303 to Step S305 may be executed in the display control process.

In the first embodiment, it is possible to configure such that a classification list 12a is generated, based on a user's setting operation, in other words, it is possible to configure such that the presence or absence of an averaging process with respect to each of the applications is set, based on a user's setting operation.

FIG. 10A is a diagram showing a setting screen to be used when the user performs a setting operation. FIG. 10B is a diagram illustrating a classification list 12a generated by a user's setting operation.

As illustrated in FIG. 10A, there is displayed, on a setting screen, a list of applications provided with checkboxes 101 on the side of the respective applications. Further, there is displayed, on the setting screen, a window 102 for notifying the user to put a checkmark in the checkbox 101 of a reliability-inclined application. Further, a setting button 103 is displayed on the setting screen.

When the user performs a tap operation on the checkbox 101 of a reliability-inclined application, a control module 11 controls to display a checkmark in the checkbox 101. After selecting the reliability-inclined application, the user performs a tap operation of the setting button 103. When the tap operation of the setting button 103 is performed, the control module 11 sets an application with a checkmark, i.e., a reliability-inclined application, as an application for which an averaging process is executed; and sets an application without a checkmark, i.e., a followability-inclined application, as an application for which an averaging process is not performed. In this way, as shown in FIG. 9B, the control module 11 generates the classification list 12a in a storage module 12.

Also, the classification list 12a in the modification of the first embodiment may be generated by a user's setting operation in the same manner as described above.

Further alternatively, the control module 11 may control the display module 13 to display a setting screen on which the user is allowed to set a new application as a reliability-inclined application or as a followability-inclined application when the new application is installed in the mobile telephone 1. In this configuration, in response to a user's operation of setting a new application as a reliability-inclined application, the control module 11 sets the new application as an application, in which an averaging process is executed, and registers the application in the classification list 12a. On the other hand, in response to a user's operation of setting a new application as a followability-inclined application, the control module 11 sets the new application as an application, in which an averaging process is not performed, and registers the application in the classification list 12a.

Further alternatively, the control module 11 may control the display module 13 to display a list screen indicating that the applications installed in the mobile telephone 1 are set as reliability-inclined applications (applications in which an averaging process is executed), or followability-inclined applications (applications in which an averaging process is not performed).

In the first embodiment and in the second embodiment, the disclosure is applied to a smartphone-type mobile telephone. The disclosure is not limited to the above. The disclosure may be applied to mobile telephones of other types such as a straight type mobile telephone, a foldable type mobile telephone, and a slidable type mobile telephone.

Further, the disclosure is not limited to a touch-panel-type mobile telephone, but is applicable to a variety of electronic devices having a touch detection function, such as a PDA (Personal Digital Assistant), a tablet PC, an electronic book terminal, a mobile music player, and a portable TV of touch panel type.

The embodiments may be changed or modified in various ways as necessary, as far as such changes and modifications do not depart from the scope of the claims hereinafter defined.

What is claimed is:

1. An electronic device, comprising:
    a display configured to display, on a display surface, a screen on which a touch operation is performed;
    a position detection unit configured to detect a touch position on the display surface touched by a user; and
    at least one processor configured to
        control the display based on the touch positions detected by the position detection unit, wherein
    the at least one processor selects a first position data or a second position data to control the display, based on a predetermined selection condition,
    the first position data being position data obtained by averaging position data on the touch positions respectively detected at detection timings, and the second position data being position data on the touch position detected at individual detection timing, or position data obtained by averaging position data on the touch positions respectively detected at detection timings whose number is smaller than the number of detection timings used in obtaining the first position data.

2. The electronic device according to claim 1, wherein the at least one processor selects the first position data or the second position data based on an application program to be executed.

3. The electronic device according to claim 1, wherein the at least one processor selects the first position data or the second position data based on a status of the screen regarding an initial touch position to be detected by the position detection unit when the touch operation is performed, and regarding a vicinity of the initial touch position.

4. The electronic device according to claim 3, wherein the screen includes a target image, and the at least one processor selects the first position data or the second position data based on whether a target image other than the target image at the initial touch position is present within a predetermined area from the initial touch position.

5. The electronic device according to claim 3, wherein the screen includes a target image, and the at least one processor selects the first position data or the second position data based on whether the size of the target image at the initial touch position is smaller than a predetermined size.

6. The electronic device according to claim 3, wherein the screen includes a target image, and the at least one processor selects the first position data or the second position data based on whether a touch operation for scrolling the screen is assigned to the target image at the initial touch position.

7. A non-transitory storage medium holding a program for a computer of an electronic device including:
    a display configured to display, on a display surface, a screen on which a touch operation is performed; and
    a position detection unit configured to detect a touch position on the display surface touched by a user the program providing the computer with:
    a function of controlling the display based on the touch positions detected by the position detection unit, and
    a function of selecting a first position data or a second position data to control the display, based on a predetermined selection condition,
    the first position data being position data obtained by averaging position data on the touch positions respectively detected at detection timings, and
    the second position data being position data on the touch position detected at individual detection timing, or position data obtained by averaging position data on the touch positions respectively detected at detection timings whose number is smaller than the number of detection timings used in obtaining the first position data.

8. A control method for an electronic device including:
    a display configured to display, on a display surface, a screen on which a touch operation is performed; and
    a position detection unit configured to detect a touch position on the display surface touched by a user, the control method comprising:
selecting a first position data or a second position data to control the display, based on a predetermined selection condition, the first position data being position data obtained by averaging position data on the touch positions respectively detected at detection timings, and the second position data being position data on the touch position detected at individual detection timing, or position data obtained by averaging position data on the touch positions respectively detected at detection timings whose number is smaller than the number of detection timings used in obtaining the first position data; and controlling the display-based on the selected position data.

* * * * *